United States Patent
Matsuoka et al.

[11] Patent Number: 5,928,298
[45] Date of Patent: Jul. 27, 1999

[54] ELECTRIC POWER STEERING APPARATUS

[75] Inventors: Hirofumi Matsuoka, Kyoto; Yasuji Noritou; Ken Fukuda, both of Kashiwara, all of Japan

[73] Assignee: Koyo Seiko Co., Ltd., Osaka, Japan

[21] Appl. No.: 08/816,750

[22] Filed: Feb. 24, 1997

[30] Foreign Application Priority Data

Feb. 23, 1996 [JP] Japan ................................. 8-036607

[51] Int. Cl.⁶ ................................................. B62D 5/04
[52] U.S. Cl. ........................... 701/41; 701/42; 180/422; 180/446
[58] Field of Search ................................. 701/22, 41, 43, 701/42; 180/197, 412, 415, 422, 443, 446

[56] References Cited

U.S. PATENT DOCUMENTS

| | | | |
|---|---|---|---|
| 4,014,308 | 3/1977 | Schweitzer | 331/65 |
| 4,664,211 | 5/1987 | Oshita et al. | 180/446 |
| 4,708,220 | 11/1987 | Noto et al. | 701/41 |
| 5,048,633 | 9/1991 | Takehara et al. | 701/41 |
| 5,052,508 | 10/1991 | Soejima | 701/41 |
| 5,053,966 | 10/1991 | Takahashi et al. | 701/41 |
| 5,065,325 | 11/1991 | Takahashi | 701/43 |
| 5,182,711 | 1/1993 | Takahashi et al. | 701/41 |
| 5,355,315 | 10/1994 | Daido et al. | 701/41 |
| 5,404,960 | 4/1995 | Wada et al. | 180/446 |
| 5,469,357 | 11/1995 | Nishimoto | 180/446 |
| 5,473,539 | 12/1995 | Shimizu et al. | 180/446 |
| 5,631,529 | 5/1997 | Shimizu et al. | 180/446 |
| 5,659,473 | 8/1997 | Noro et al. | 701/42 |
| 5,698,956 | 12/1997 | Nishino et al. | 180/443 |
| 5,752,209 | 5/1998 | Nishimoto et al. | 701/42 |
| 5,835,872 | 11/1998 | Matsuoka et al. | 701/42 |

*Primary Examiner*—William A. Cuchlinski, Jr.
*Assistant Examiner*—Gertrude Arthur
*Attorney, Agent, or Firm*—Darby & Darby

[57] ABSTRACT

An electric power steering apparatus comprises broken point characteristics determining means for determining a value of a steering torque signal corresponding to a broken point of a broken line function on the basis of a vehicle speed signal from a vehicle speed sensor, a broken line function circuit for determining the broken line function in accordance with the broken point determining signal determined by the broken point characteristics determining means and outputting an analog signal corresponding to the broken line function, and means for determining a target value of a motor current to drive an electric motor for assisting steering on the basis of the analog signal.

3 Claims, 7 Drawing Sheets

ELECTRIC POWER STEERING APPARATUS

BACKGROUND OF THE INVENTION

The present invention relates to improvement of an electric power steering apparatus for drive-controlling a steering force assistant motor by setting a target value of a motor current for driving the motor for assisting steering force on the basis of steering torque.

The electric power steering apparatus drive-controls a motor for assisting steering force on the basis of a target current value determined by a steering torque. Conventional steering torque—target current characteristics are represented by a broken line which is point-symmetric with respect to the point wherein the steering torque is zero, as shown in FIG. 1. The inside part of a broken point in which the absolute value of the steering torque of the broken line is small is a low assist region in which the target current is approximately zero. The outside part of the broken point in which the absolute value of the steering torque is large is a region to assist the steering force by enlarging the target current. The region of the outside of this broken point is contrived to assist the steering force according to the running condition such that when a vehicle speed is low a gain of the target current value is enlarged to make the steering assistant force becomes large, and when the vehicle speed is high the gain is reduced to make the steering assistant force small.

However, when only the gain of the target current value is varied in accordance with the vehicle speed as described above, because of the fixation of the low assist region setting the target current to be approximately zero, freedom of the steering torque—target current characteristics is low. Accordingly, it was not possible to obtain optimum steering assistant force applicable to the vehicle speed such that, in case of the low speed, the width of the low assist region is small to give light steering feeling, and in case of the high speed, the width of the low assist region is large to give heavy (stabilized) steering feeling.

BRIEF SUMMARY OF THE INVENTION

The present invention has been made to dissolve the problematic points as stated above. An object of the present invention is to provide an electric power steering apparatus which can give optimum steering assistant force for the vehicle speed.

An electric power steering apparatus according to the present invention is characterized in that, in an electric power steering apparatus for drive-controlling a steering force assistant motor by setting a target value of a motor current for driving the motor on the basis of a steering torque signal from a torque sensor for detecting a steering torque so that the motor current comes to the target value, the apparatus comprises a broken line function circuit for outputting an analog signal of a value proportional to a broken line function based on the steering torque signal, means for setting the target value based on the analog signal, a vehicle speed sensor, and broken point characteristic determining means for determining a value of the steering torque signal corresponding to a broken point of the broken line function based on the vehicle speed signal from the vehicle speed sensor to output the signal to the broken line function circuit as a broken point determining signal, so that the broken line function circuit determines the broken line function in accordance with the broken point determining signal.

Therefore, a low assist region in which the target value of the motor current is approximately zero can be set to a width corresponding to the vehicle speed. Accordingly, optimum steering assistant force for the vehicle speed can be obtained such that at the time of the low speed, the width of the low assist region is small to give light steering feeling, and at the time of the high speed, the width of the low assist region is large to give heavy (stabilized) steering feeling.

Here, the broken point characteristic determining means are characterized by having the vehicle speed—broken point characteristic determining means for determining the value of the steering torque signal corresponding to the broken point of the broken line function on the basis of the vehicle speed signal to output a PWM signal according to the determined value, a voltage dividing circuit wherein resistances are connected in series, and a bypass circuit having switching means which is connected in parallel with at least one resistance of the voltage dividing circuit and switched ON/OFF by the PWM signal, thereby outputting the voltage value divided by the voltage dividing circuit as the broken point determining signal.

For example, when the duty factor of the PWM signal is large, the average value of the current flowing in the bypass circuit is large, while when the duty factor is small, the average value of the current is small. Accordingly, it is possible to control the voltage-divided value of the voltage dividing circuit by controlling the current flowing in the bypass circuit, and to output the voltage-divided value as the broken point determining signal. Therefore, by this PWM signal, the broken point of the broken line function can be set to the position corresponding to the vehicle speed.

The voltage dividing circuit is characterized by having a capacitor connected to the resistances in parallel. Hense, the capacitor acts to smooth the output of the voltage dividing circuit and the effect of ON/OFF of the switching means upon voltage dividing is removed. Consequently, the broken point determining signal can be kept stable, and the position of the broken point of the broken line function can be stabilized.

The above and further objects and features of the invention will more fully be apparent from the following detailed description with accompanying drawings.

DETAILED DESCRIPTION OF THE INVENTION

Hereinafter, the present invention is described in detail with reference to the drawings to show the embodiments thereof.

Figure 1:
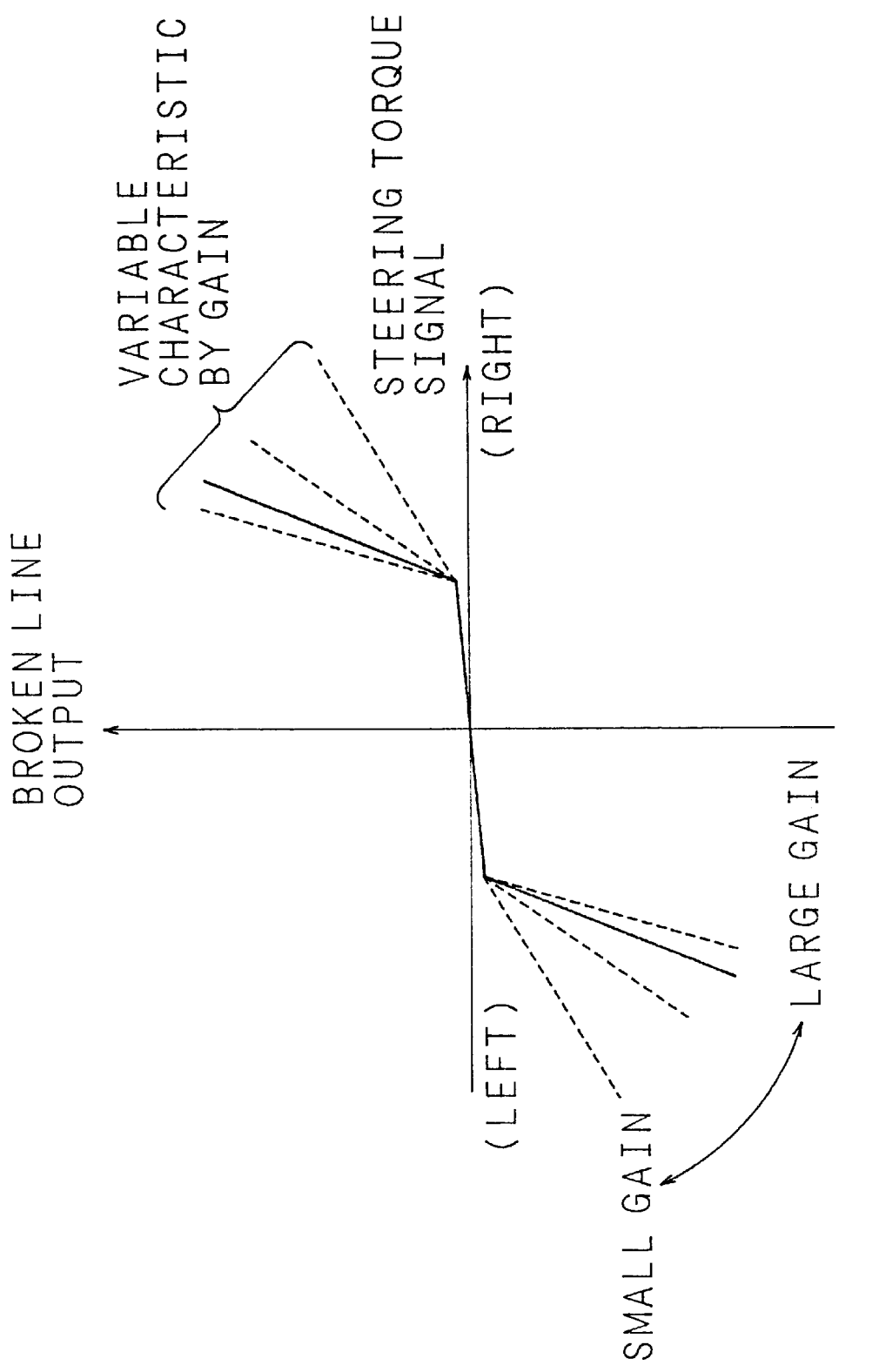
FIG. 1 is a view to show characteristics of steering torque—current target value of a steering force assistant motor in a conventional apparatus.
Figure 2:
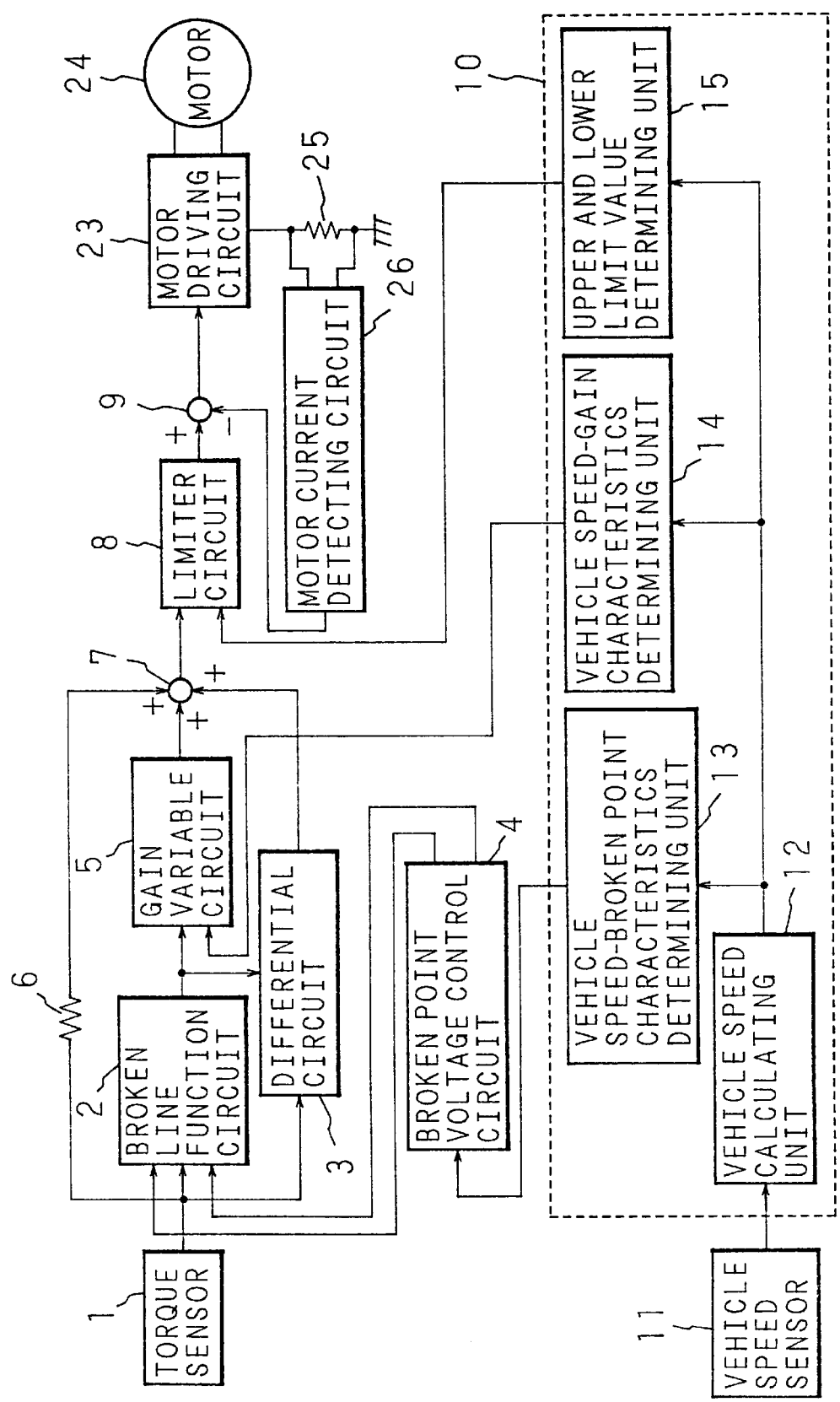
FIG. 2 is a schematic block diagram showing a constitution of an electric power steering apparatus according to the present invention.
Figure 3:
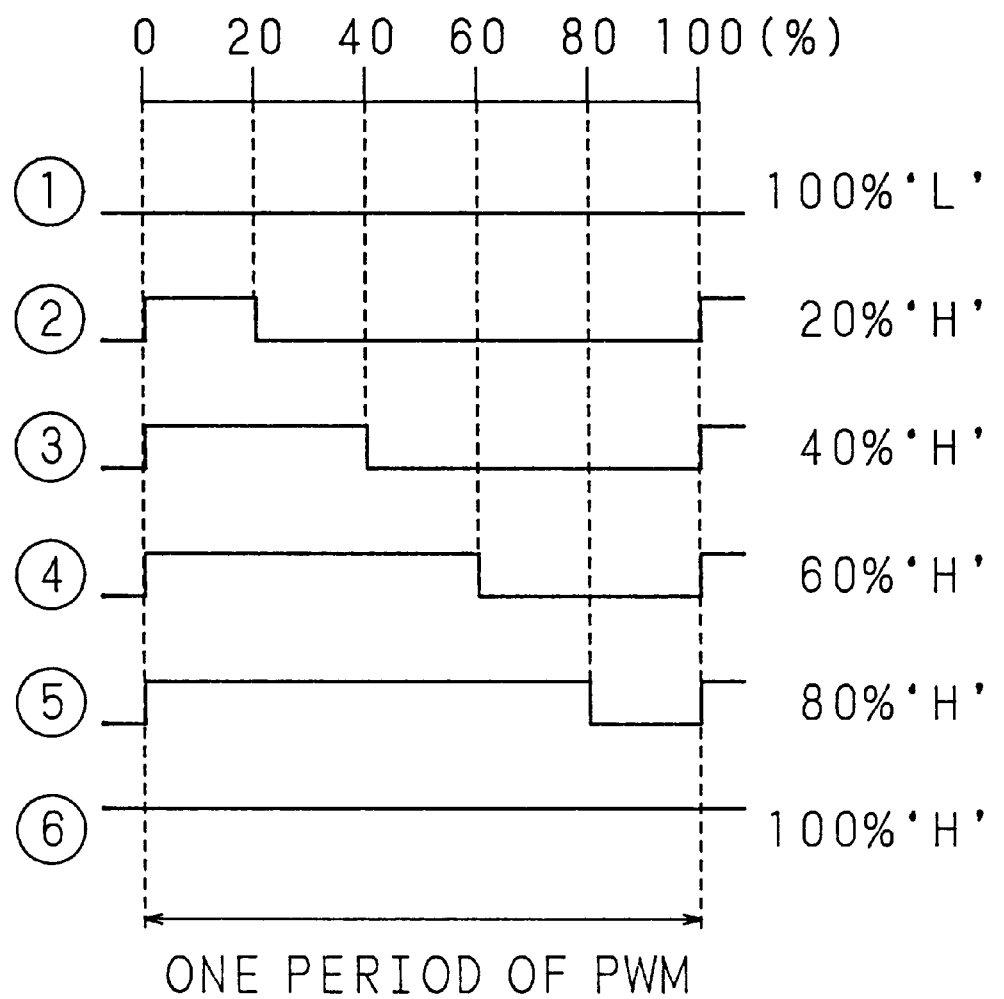
FIG. 3 is a timing chart illustrating of a PWM signal outputting by a vehicle-speed broken point characteristics determining unit.

FIG. 2 is a block diagram showing a constitution of an essential part of an electric power steering apparatus according to the present invention. In this electric power steering apparatus, a steering torque signal from a torque sensor 1 provided on a steering shaft is given to an addition circuit 7 through a broken line function circuit 2, a differential circuit 3 for phase compensation, and a resistance 6. The broken line function circuit 2 is a circuit for outputting an analog signal corresponding to a broken line function representing target current characteristics of a steering force assistant motor 24 based on the steering torque signal.

A vehicle speed signal from a vehicle speed sensor 11 is given to a microcomputer 10, and this vehicle speed signal is converted to a digital signal in a vehicle speed calculating unit 12, and then given to a vehicle speed-broken point characteristics determining unit 13, a vehicle speed-gain characteristics determining unit 14, and an upper and lower limit value determining unit 15.

The vehicle speed-broken point characteristics determining unit 13 decides, on the basis of the given vehicle speed signal, a value of the steering torque signal corresponding to a broken point of the broken line function held by the broken line function circuit 2, and output the PWM signals ①–⑥ as exemplified in FIGS. 3A–3D, corresponding to the value and the change of the vehicle speed to high and low.

The vehicle speed—gain characteristics determining unit 14 decides, on the basis of the given vehicle speed signal, a gain of a gain variable circuit 5, and indicates the determined gain to the gain variable circuit 5 by a digital signal of four figures.

The upper and lower limit value determining unit 15 determines upper and lower limit values of a limiter circuit 8 on the basis of the given vehicle speed signal, and D/A-converts the determined upper and lower limit values to output to the limiter circuit 8.

Figure 5:
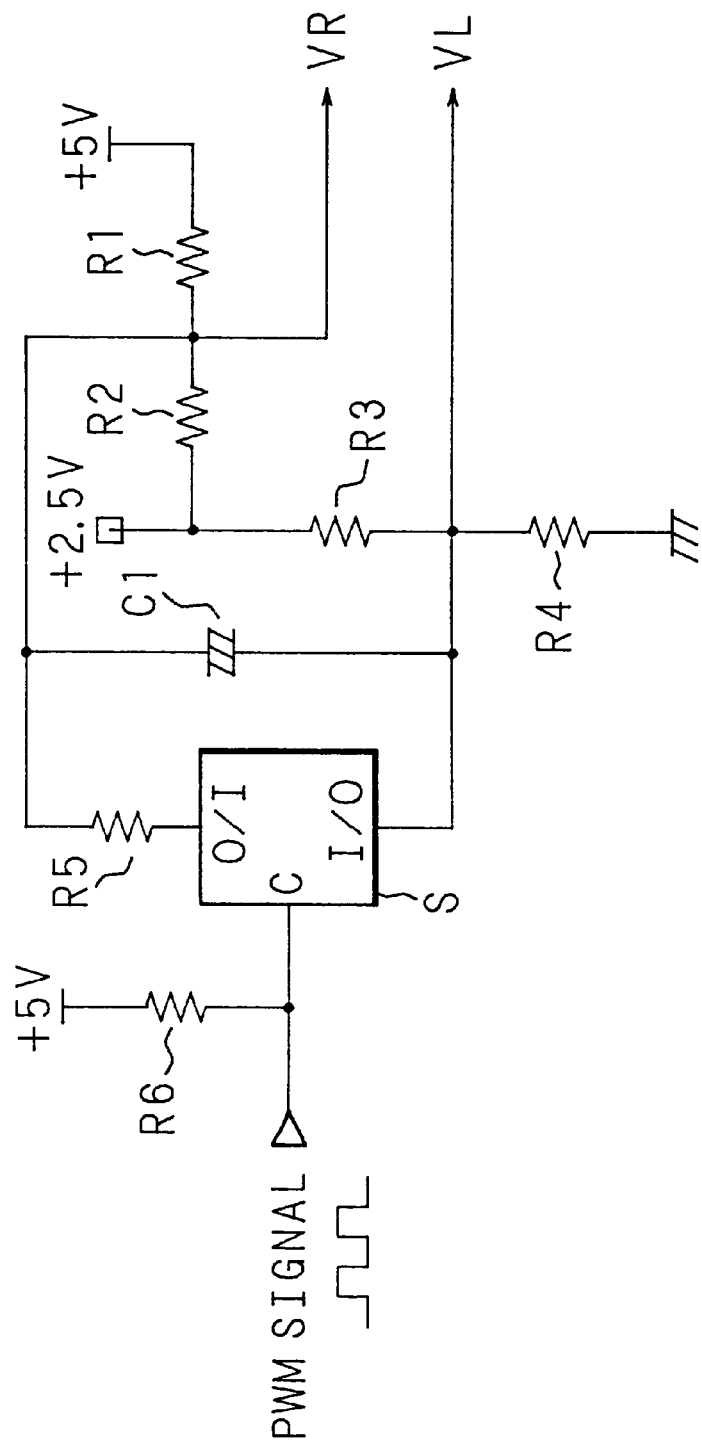
FIG. 5 is a circuit diagram showing a constitution of a broken point voltage control circuit.

The PWM signal from the vehicle speed—broken point characteristics determining unit 13 is given to a broken point voltage control circuit 4. The broken point voltage control circuit 4 has a circuit constitution as shown in FIG. 5, wherein resistances R1, R2, R3 and R4 (R1=R4, R2=R3) are connected in series between a 5V fixed voltage terminal and an earth terminal, and 2.5V fixed voltage is supplied to the connecting point of resistances R2 and R3.

To the series connected resistances R2 and R3 there are connected in parallel a series circuit of a resistances R5 and a switching element S. The control terminal of the switching element S is connected to a pull-up resistance R6 whose other end is connected to a 5V fixed voltage terminal, and the PWM signal from the vehicle speed—broken point characteristics determining unit 13 is given to the control terminal.

To the series connected resistances R2 and R3 a smooth capacitor C1 is connected in parallel to smooth the voltage between the resistances R2 and R3.

A broken point indicating signal VR of the broken line function in the right direction of the steering torque is outputted through the connecting point of the resistances R1 and R2, and a broken point indicating signal VL of the broken line function in the left direction of the steering torque is outputted through the connecting point of the resistances R3 and R4. The signals VR and VL are given to the broken line function circuit 2, respectively.

In such broken point voltage control circuit 4, by the ON/OFF operation of the switching element S according to the PWM signal, for example, when the duty factor of the PWM signal is large, the average value of the current flowing in the bypass circuit comprising the resistance R5 and the switching element S becomes large. On the other hand, when it is small, the average value of the current becomes small. In other words, as shown in FIGS. 3A–3D, when the PWM signals ①–⑥ vary from 0 to 100%, the average value of the current flowing in the bypass circuit becomes large, and accompanied with it, the current flowing to the resistances R1 and R4 increases and the current flowing to the resistances R2 and R3 decreases.

Figure 4:
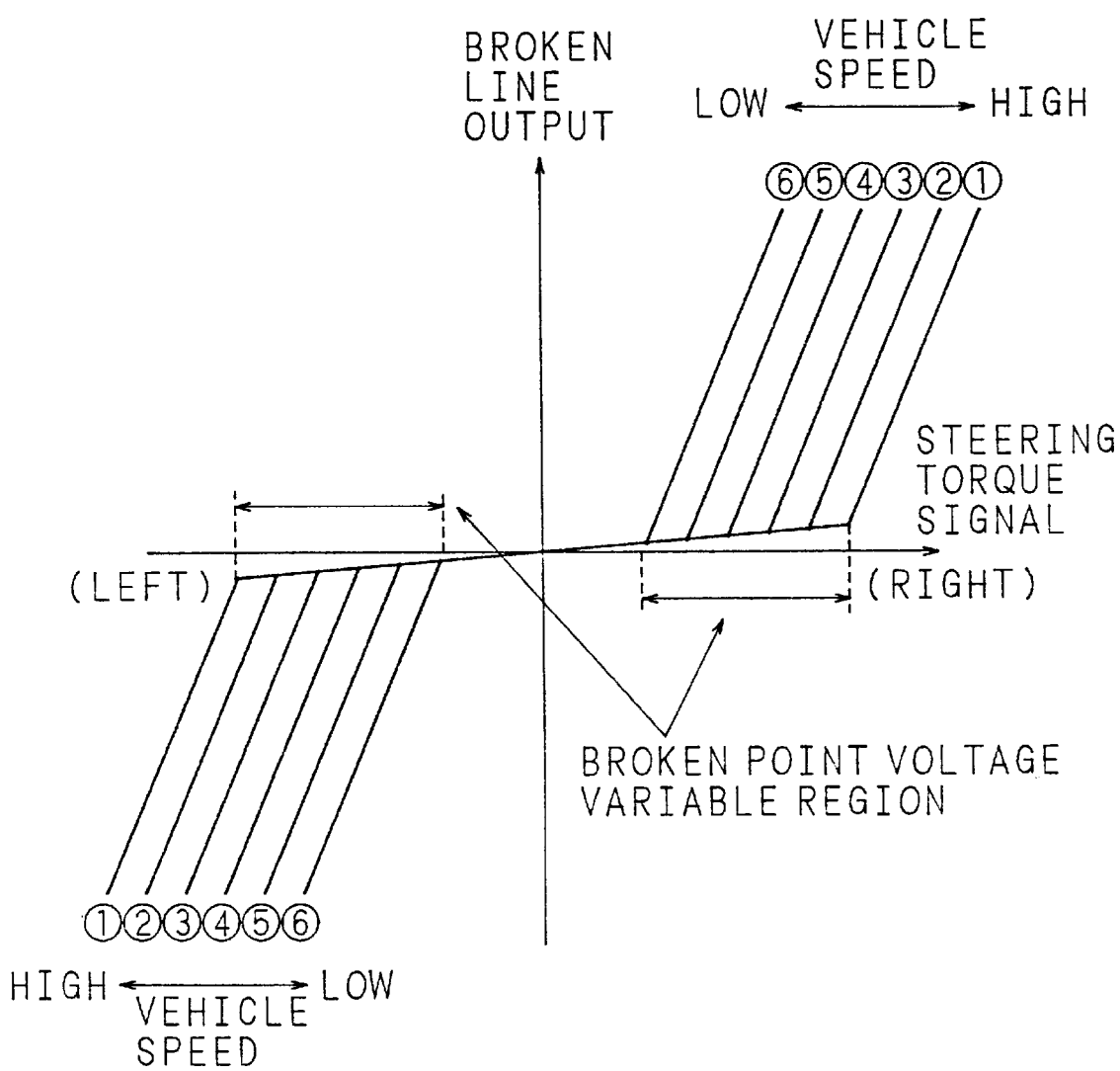
FIG. 4 is a view for illustrating the shifting of broken points of a broken line function outputted by a broken line function circuit.

Along with the above, the voltage centering on the fixed voltage of 2.5V between the broken point indicating signals VR and VL becomes smaller, and the broken line function outputted by the broken line function circuit 2 shifts so that a low assist region wherein the target current is approximately zero is narrowed as shown by the broken line function ①–⑥ in FIG. 4.

An analog signal corresponding to the broken line function outputted by the broken line function circuit 2 is given to the gain variable circuit 5 and the differentiating circuit 3.

The gain variable circuit 5 sets up the gain by the indication from the vehicle speed—gain characteristics determining unit 14 in the microcomputer 10, and by the gain, amplifies the analog signal corresponding to the broken line function to output it to the addition circuit 7.

The differentiating circuit 3 adds together the analog signal corresponding to the broken line function and a signal obtained by differentiating the steering torque signal, and then reverses in polarity the added signal to output to the addition circuit 7.

The addition circuit 7 adds the steering torque signal attenuated by the resistance 6 at a predetermined attenuation rate, an output signal of the gain variable circuit 5, and an output signal of the differential circuit 3 attenuated at a predetermined attenuation rate, and outputs the added signal to the limiter circuit 8 as a current target value of the steering force assistant motor 24.

The limiter circuit 8 sets the upper and lower limit values of the current target value of the motor 24 by the indication from the upper and lower limit value determining unit 15 in the microcomputer 10, limits the current target value of the motor 24 by the upper and lower limit values to output the limited value to a differential amplifying circuit 9.

The differential amplifying circuit 9 outputs to a motor driving circuit 23 a signal corresponding to the difference between the current target value of the motor 24 and a motor current detection signal from a motor current detecting circuit 26. The motor driving circuit 23 drives the motor 24 for assisting steering force corresponding to the signal from the differential amplifying circuit 9 by PWM control. The motor current detecting circuit 26 detects the motor current by the two-end voltage of a resistance 25 connected between the motor driving circuit 23 and the grounding terminal and outputs the detection signal of the motor current to the differential amplifying circuit 9.

Hereinafter, the operation of the electric power steering apparatus having the constitution as above is explained.

The steering torque signal from the torque sensor 1 is given to the broken line function circuit 2, differential circuit 3, and resistance 6 through the addition circuit 7.

On the other hand, the vehicle speed signal from the vehicle speed sensor 11 is given to the microcomputer 10. The vehicle speed signal is converted to the digital signal by the vehicle speed calculating unit 12, and then given to the vehicle speed—broken point characteristics determining unit 13, the vehicle speed—gain characteristics determining unit 14, and the upper and lower limit value determining unit 15.

The vehicle speed—broken point characteristics determining unit 13 determines, on the basis of the given vehicle speed signal, the value of the steering torque signal corresponding to the broken point of the broken line function held by the broken line function circuit 2, and outputs the PWM signal corresponding to the determined value.

The vehicle speed—gain characteristics determining unit 14 determines, on the basis of the given vehicle speed signal, the gain of the gain variable circuit 5, and converts the determined gain to the digital signal of four figures to give it to the gain variable circuit 5.

The upper and lower limit value determining unit 15 determines, on the basis of the given vehicle speed signal, the upper and lower limit values of the limiter circuit 8, and D/A-converts the determined upper and lower limit values to give indication to the limiter circuit 8.

The PWM signal from the vehicle speed—broken point characteristics determining unit 13 is given to the broken point voltage control circuit 4. In the broken point voltage control circuit 4, on the basis of the variation of the duty factor of the PWM signal from large to small, the voltage centering on the fixed voltage 2.5V between the broken point indication signals VR and VL varies from small to large.

Figure 6A:
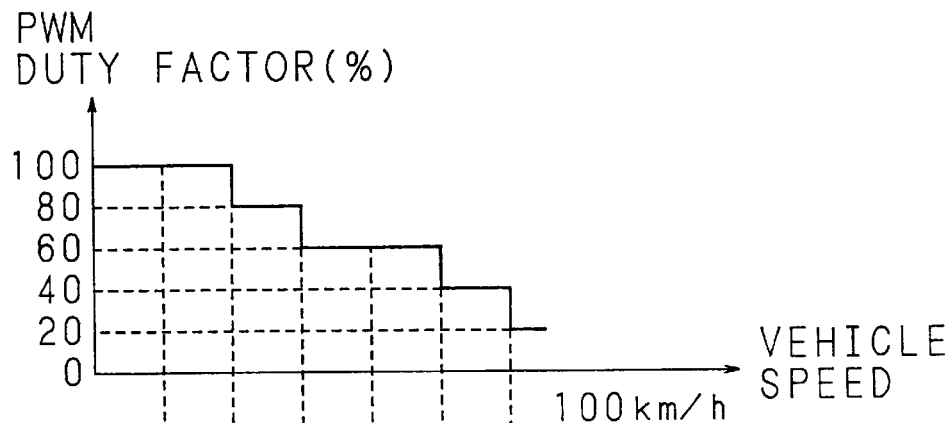
FIG. 6A is a view to illustrate a PWM signal outputted by a vehicle speed-broken point characteristics determining unit.
Figure 6B:
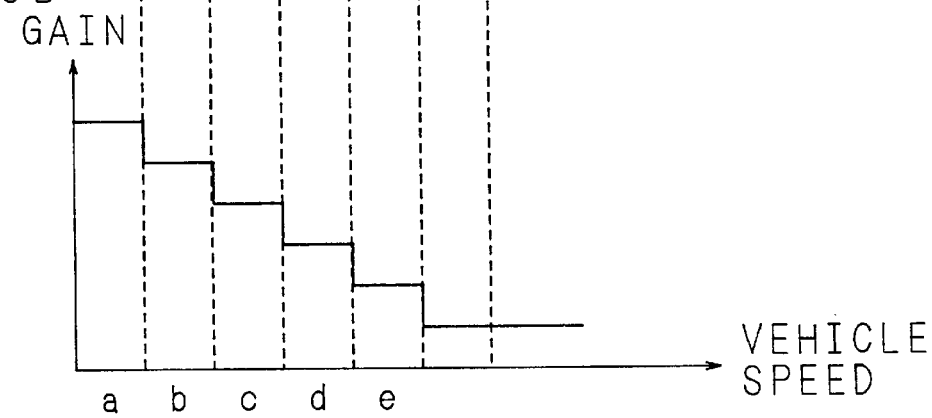
FIG. 6B is a view to illustrate a gain value outputted by a vehicle speed-gain characteristics determining unit.
Figure 6C:
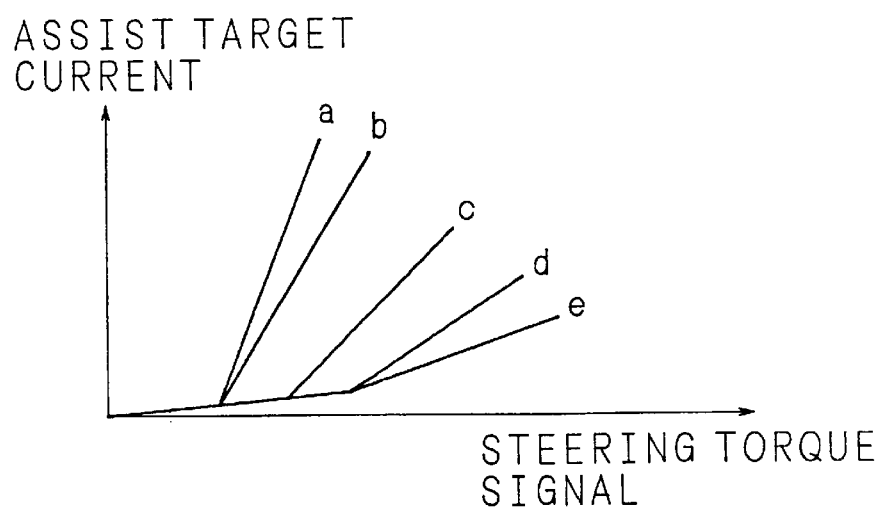
FIG. 6C is a view to illustrate a broken line function outputted by a gain variable circuit.

For example, in the characteristics of the vehicle speed—broken point characteristics determining unit 13, as shown in FIG. 6A, assuming that the duty factors of the PWM signal coordinate with the vehicle speed regions a, b, c, d and e are 100, 100, 80, 60, and 60%, and, in the characteristics of the vehicle speed—gain characteristics determining unit 14, as shown in FIG. 6B, the gains coordinate with the vehicle speed regions a, b, c, d, and e are the characteristics which decrease stepwise by region with the gain coordinate with the region a set to be the largest, the broken line function outputted by the gain variable circuit 5 transits as in the broken line functions a, b, c, d and e of FIG. 6C to the transitions of the vehicle speed regions a, b, c, d, and e (illustration shows only the broken line function in the case of the right direction of steering torque).

The analog signal corresponding to the broken line function outputted by the broken line function circuit 2 is given to the gain variable circuit 5 and the differential circuit 3.

The gain variable circuit 5 sets the gain by the indication from the vehicle speed—gain characteristics determining unit 14 in the microcomputer 10, and by this gain amplifies the analog signal coordinate with the broken line function to output it to the addition circuit 7.

The differential circuit 3 adds together the analog signal corresponding to the broken line function and the differential signal of the steering torque signal, and then reverses in polarity the added signal to output it to the addition circuit 7.

The addition circuit 7 adds the steering torque signal attenuated at the predetermined attenuation rate by the resistance 6, the output signal of the gain variable circuit 5, and the output signal of the differential circuit 3 attenuated at the predetermined attenuation rate, and outputs the added signal as the current target value of the steering force assistant motor 24. In the characteristics (broken line function) of the current target value shown in FIG. 6C, the inclination of the central region having a small gain (low assist region) is determined by the value of the resistance 6.

The current target value of the motor 24 outputted by the addition circuit 7 is inputted to the limiter circuit 8. The limiter circuit 8 sets the upper and lower limit values of the current target value of the motor 24 by the indication from the upper and lower limit value determining unit 15, and limits the current target value of the motor 24 to the differential amplifying circuit 9. The upper and lower limit values have the same width above and below centering on the predetermined reference voltage.

The differential amplifying circuit 9 outputs the signal corresponding to the difference between the current target value of the motor 24 and the motor current detection signal from he motor current detecting circuit 26 to the motor driving circuit 23. The motor driving circuit 23 drives the motor 24 for assisting steering by PWM control in accordance with the signal from the differential amplifying circuit 9. The motor current detecting circuit 26 detects the motor current by the two-ends voltage of the resistance 25 in which the motor current of the motor 24 flows, and outputs the detection signal of the motor current to the differential amplifying circuit 9 for feedback control.

Figure 7:
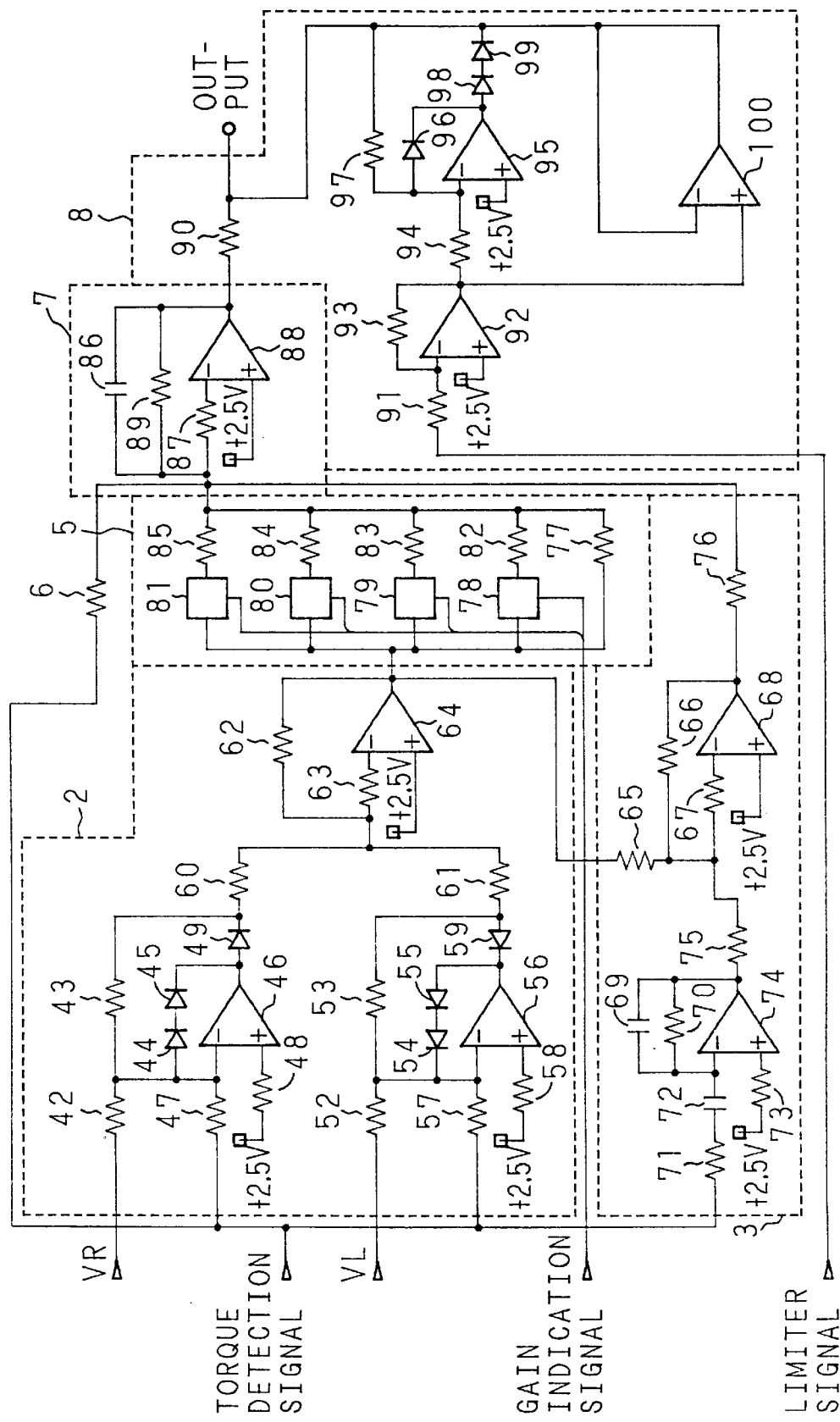
FIG. 7 is a circuit diagram showing the broken line function circuit, a differentiating circuit, the gain variable circuit, an addition circuit and a limiter circuit.

FIG. 7 is a circuit diagram showing the broken line function circuit 2, the differential circuit 3, the gain variable circuit 5, the addition circuit 7 and the limiter circuit 8.

In the broken line function circuit 2, the steering torque signal from the torque sensor 1 is inputted to the inverting input terminals of OP amplifiers 46 and 56 through resistances 47 and 57.

To the non-inverting input terminal of the OP amplifier 46, a fixed voltage of 2.5 V is applied through resistance 48, and to the output terminal thereof the anode of a diode 49 is connected. The cathode of the diode 49 is connected to the inverting input terminal thereof through a resistance 43. The resistances 47 and 43 are set to be an equal value. To the inverting input terminal the anode of a diode 44 of forward connected diodes 44 and 45 is connected, and to the output terminal the cathode of the diode 45 is connected. To the inverting input terminal, a broken point indicating signal VR from the broken point voltage control circuit 4 is applied through a resistance 42.

To the non-inverting input terminal of the OP amplifier 56, a 2.5 V fixed voltage is applied through a resistance 58, and to the output terminal the cathode of a diode 59 is connected. The anode of the diode 59 is connected to the inverting input terminal through a resistance 53. The resistances 57 and 53 are set to be an equal value. To the inverting input terminal, the cathode of a diode 54 of forward connected diodes 54 and 55 is connected, and to the output terminal, the anode of the diode 55 is connected. To the inverting input terminal, the broken point indicating signal VL from the broken point voltage control circuit 4 is applied through a resistance 52.

The two circuits mainly including the OP amplifiers 46 and 56 mentioned above are the ideal diodes having mutually inverted characteristics in which the negative feedback voltages are adjusted respectively by the broken point indicating signals VR and VL from the broken point voltage control circuit 4 and with application of 2.5 V bias voltage.

The outputs of these ideal diodes are added together through resistances 60 and 61, respectively, and inputted to the inverting input terminal of an OP amplifier 64 through resistance 63.

To the non-inverting input terminal of the OP amplifier 64, a 2.5 V fixed voltage is applied, and the output terminal is connected to the inverting input terminal through a resistances 62 and the resistance 63. The circuit essentially including the OP amplifier 64 is an inverting amplifying circuit having an inverted voltage of 2.5 V.

In the broken line function circuit 2, when the broken point indicating signals VR and VL are respectively 2.8V and 2.2V, in case that the steering torque signal is 2.2V–2.8V, the voltage of the inverting input terminal of the OP amplifier 46 shows predominant tendency of being pulled up from the voltage of 2.5V by virtual short-circuiting due to the 2.8V of the broken point indicating signal VR, and the OP amplifier 46 outputs a negative voltage. The voltage of the inverting input terminal of the OP amplifier 56 shows predominant tendency of being pulled down from the voltage of 2.5V by virtual short-circuiting due to 2.2V of the broken point indicating signal VL, and the OP amplifier 56 outputs a positive voltage. As a result, the ideal diodes of OP amplifiers 46 and 56 both output 2.5V.

When the steering torque signal is lower than 2.2V, a tendency to pull down the voltage of the inverting input terminal of the OP amplifier 46 from 2.5V becomes predominant, and the OP amplifier 46 outputs a positive voltage. As a result, the ideal diode of he OP amplifier 46 outputs a higher voltage as the steering torque signal becomes lower.

When the steering torque signal is higher than 2.8V, a tendency to pull up the voltage of the inverting input terminal of the OP amplifier 56 from 2.5V becomes predominant, and the OP amplifier 56 outputs a negative voltage. As a result, the ideal diode of the OP amplifier 56 outputs a lower voltage as the steering torque signal becomes higher.

The inverting amplifying circuit of the OP amplifier 64 inverts polarity of the output voltage signal of the ideal diode of the OP amplifiers 46 and 56 by utilizing 2.5V as an inverted voltage.

Accordingly, the broken line function circuit 2 has a dead zone (2.2V–2.8V) determined by the broken point indicating signals VR and VL, centering on 2.5V, and has broken line form input and output characteristics showing 180° rotation symmetry (point symmetry).

When the broken point indicating signals VR and VL vary respectively to 2.7V and 2.3V/2.9V and 2.1V, etc. at equal voltage from 2.5V in the positive and negative directions, the dead zone varies in the same manner as above, and the broken points in the input and output characteristics of the broken line form shift mutually in reverse directions.

In the differential circuit 3, the steering torque signal from the torque sensor 1 is inputted to the inverting input terminal of an OP amplifier 74 through a resistance 71 and a capacitor 72.

To the OP amplifier 74, a fixed voltage of 2.5V is applied to the non-inverting input terminal through a resistance 73, and negative feedback is applied by the parallel circuit of a resistance 70 and a capacitor 69.

The circuit mainly including the OP amplifier 74 is a differential circuit, which inverts the polarity of the steering torque signal from the torque sensor 1, differentiates it, and then outputs it to the circuit centering on an OP amplifier 68 through a resistance 75.

The circuit mainly including the OP amplifier 68 adds together the differentiated signal of the steering torque signal from the circuit essentially including the OP amplifier 74 and the output signal of the broken line function circuit 2 received through a resistance 65, and then inputs the additional result to the inverting input terminal of the OP amplifier 68 through a resistance 67.

With the OP amplifier 68, to the non-inverting input terminal, a fixed voltage of 2.5V is applied, and negative feedback is applied by a resistance 66 and the resistance 67.

The circuit mainly including the OP amplifier 68 of the differential circuit 3 is an inverting amplifying circuit utilizing 2.5V as an inverting voltage, and it inverts the polarity of the signal obtained by adding together the differentiated signal of the steering torque signal and the output signal of the broken line function circuit 2 to output it.

In the gain variable circuit 5 and the addition circuit 7, the output of the broken line function circuit 2 is inputted to analog switch circuit in which series circuits respectively including switch circuits 78, 79, 80 and 81 and resistances 82, 83, 84 and 85, and a resistance 77 are connected in parallel, and the output of the analog switch circuit is inputted to the inverting input terminal of an OP amplifier 88 through a resistance 87. The switch circuits 78, 79, 80 and 81 receive the gain indication signal from the vehicle speed—gain characteristics determining unit 14 of the microcomputer 10 and switches ON/OFF to set the gain.

Also, the gain variable circuit 5 and addition circuit 7 may realize the variation amount of the vehicle speed characteristics (gain) of the electric power steering apparatus in an equal width by setting the resistance ratios of the resistances 82, 83, 84 and 85 to, for example, 1:2:4:8.

In the OP amplifier 88, a fixed voltage of 2.5V is applied to the non-inverting input terminal and negative feedback is applied by a parallel circuit of a resistance 89 and a capacitor 86, and the resistance 87.

The circuit mainly including the OP amplifier 88 is an inverting amplifying circuit having 2.5V as inverting voltage.

This inverting amplifying circuit adds together the steering torque signal attenuated by the resistance 6 at the predetermined attenuation rate, the output signal of the gain variable circuit 5, and the output signal of the differential circuit 3 attenuated by the resistance 76 at the predetermined attenuation rate, and then inverts—amplifies the result to output it as the target current value of the motor 24.

In the limiter circuit 8, a limiter signal from the upper and lower limit value determining unit 15 of the microcomputer 10 is inputted to the inverting input terminal of an OP amplifier 92 through a resistance 91.

With the OP amplifier 92, a fixed voltage of 2.5V is applied to the non-inverting input terminal, and a negative feedback is applied by a resistance 93. The circuit essentially including the OP amplifier 92 is an inverting amplifying circuit using 2.5V as an inverting voltage.

The output of this inverting amplifying circuit is inputted to the non-inverting input terminal of an OP amplifier 100, and also inputted to the inverting input terminal of an OP amplifier 95 through a resistance 94.

With the OP amplifier 100, the output terminal is connected to the inverting input terminal to make a buffer circuit.

To the non-inverting input terminal of the OP amplifier 95, a fixed voltage of 2.5V is applied, and to the output terminal there is connected the anode of a diode 98 of forward connected diodes 98 and 99. The cathode of the diode 99 is connected to the inverting input terminal through a resistance 97. To the inverting input terminal, the anode of a diode 96 is connected, and to the output terminal, the cathode of the diode 96 is connected.

The cathode of the diode 99 and the output terminal of the OP amplifier 100 are connected to the output terminal of the OP amplifier 88 through a resistance 90, and the connecting point of the cathode of the diode 99, the output terminal of the OP amplifier 100, and the resistance 90 forms an output terminal of the limiter circuit 8.

In the resistance 94 and the resistance 97, the resistance values are set to 1:1.

In the limiter circuit 8, when the output of the OP amplifier 92 is set to, for example, 4.0V, by the limiter signal from the upper and lower limit value determining unit 15 of the microcomputer 10, the ideal diode mainly including the OP amplifier 95 and the buffer circuit of the OP amplifier 100 have the input voltage of 4.0V.

In case of such a setting, when the output voltage of the OP amplifier 88 is 1V–4V, the voltage of the inverting input terminal of the OP amplifier 95 shows predominant tendency of being pulled up from the voltage of 2.5V by virtual short-circuiting due to the input voltage of 4.0V, and the OP amplifier 95 outputs a negative voltage, whereby the diode 96 turns ON and diodes 98 and 99 turn OFF.

Here, the OP amplifier 100 is an open corrector type, and the buffer circuit of the OP amplifier 100 does not work when a voltage lower than the input voltage is applied to the output terminal.

As a result, the ideal diode of the OP amplifier 95 does not have an effect on the output voltage of the limiter circuit 8 by the voltage drop of the resistance 97. The output voltage of the limiter circuit 8 becomes the output voltage of the OP amplifier 88 which is under effect of the voltage drop by the resistance 90.

When the output voltage of the OP amplifier 88 is lower than 1V, the voltage of the inverting input terminal of the OP amplifier 95 has predominant tendency to be pulled down from the voltage of 2.5V which is the voltage by virtual short-circuiting, and the OP amplifier 95 outputs a positive voltage to make the diode 96 OFF, and the diodes 98 and 99 ON.

As a result, the output voltage of the ideal diode of the OP amplifier 95 is maintained at approximately 1V, and the output voltage of the limiter circuit 8 is also maintained at approximately 1V.

When the output voltage of the OP amplifier 88 is higher than 4V, the buffer circuit of the OP amplifier 100 maintains the output voltage of approximately 4V which is nearly equal to the input voltage and introduces the current. As a result, the output voltage of the limiter circuit 8 is also maintained to approximately 4V.

At this time, as the voltage of the inverting input terminal of the OP amplifier 95 has predominant tendency to be pulled up from the voltage of 2.5V which is the voltage by virtual short-circuiting, the OP amplifier 95 outputs a negative voltage to make the diode 96 ON, and the diodes 98 and 99 OFF. The ideal diode of the OP amplifier 95 does not affect the output voltage of the limiter circuit 8 due to the voltage drop of the resistance 97.

In the same manner as described above, the limiter circuit 8 may set the upper and lower limit values to be equal voltage width, by taking the output voltage of the OP amplifier 92 set by the limiter signal from the upper and lower limit value determining unit 15 of the microcomputer 10 to be the upper limit value, and 2.5V to be the central voltage.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electric power steering apparatus comprising:

an electric motor for assisting steering force;

a torque sensor detecting a steering torque and producing a steering torque signal representative thereof;

a broken line function circuit outputting an analog signal of a value corresponding to a broken line function based on the steering torque signal from the torque sensor;

a target value generator producing a target value of motor current for driving the motor on the basis of said analog signal;

a vehicle speed sensor producing a pulse signal representing detected vehicle speed;

a digital vehicle speed—broken point characteristic processor determining a value of the steering torque signal corresponding to a broken point of the broken line function on the basis of the pulse signal from the vehicle speed sensor, and outputting a PWM signal corresponding to the determined steering torque signal value; and an analog broken point voltage control circuit converting said PWM signal outputted from said vehicle speed—broken point characteristic processor into an analog signal, and outputting said analog signal to said broken line function circuit as a broken point determining signal, wherein said broken line function circuit determines the broken line function in accordance with the broken point determining signal.

2. An electric power steering apparatus according to claim 1, wherein said broken point characteristic processor includes:

said vehicle speed—broken point characteristic processor being a microprocessor;

a voltage dividing circuit wherein resistances are connected in series; and a bypass circuit having switching means connected in parallel with at least one resistance of the voltage dividing circuit and to be switched ON/OFF by the PWM signal, and said broken point characteristic processor outputting a voltage value divided by the voltage dividing circuit as said broken point determining signal.

3. A power steering apparatus according to claim 2, wherein the voltage dividing circuit includes a capacitor connected to at least one resistance in parallel.

* * * * *